United States Patent
Song et al.

(10) Patent No.: US 11,489,333 B2
(45) Date of Patent: Nov. 1, 2022

(54) INRUSH CURRENT LIMITING TRANSFORMER ENERGIZATION APPARATUSES, METHODS, SYSTEMS, AND TECHNIQUE

(71) Applicant: ABB Schweiz AG, Baden (CH)

(72) Inventors: Xiaoqing Song, Apex, NC (US); Yu Du, Apex, NC (US); Yuzhi Zhang, Apex, NC (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/167,290

(22) Filed: Feb. 4, 2021

(65) Prior Publication Data

US 2022/0247167 A1    Aug. 4, 2022

(51) Int. Cl.
*H02H 9/00* (2006.01)
*H02H 1/00* (2006.01)

(52) U.S. Cl.
CPC .......... *H02H 9/002* (2013.01); *H02H 1/0007* (2013.01)

(58) Field of Classification Search
CPC ..................................................... H02H 9/002
See application file for complete search history.

(56) References Cited

U.S. PATENT DOCUMENTS

| 3,750,004 | A | | 7/1973 | Walker |
| 5,210,685 | A | | 5/1993 | Rosa |
| 5,479,086 | A | * | 12/1995 | Konstanzer ............ H02H 9/002 |
| | | | | 323/238 |
| 7,459,804 | B2 | | 12/2008 | Marwali et al. |
| 7,589,438 | B2 | | 9/2009 | Galm |
| 9,520,874 | B2 | | 12/2016 | Bush et al. |
| 9,720,476 | B1 | | 8/2017 | Nguyen et al. |
| 2002/0070790 | A1 | | 6/2002 | Westerman |

(Continued)

FOREIGN PATENT DOCUMENTS

| DE | 4108106 A1 | 9/1992 |
| JP | H08256431 A | 10/1996 |

OTHER PUBLICATIONS

Cheng, Po-Tai et al., "Design of an Impulse Commutation Bridge for the Solid State Transfer Switch", IEEJ Transactions on Industry Applications, 2006, pp. 1024-1031.

(Continued)

*Primary Examiner* — Jared Fureman
*Assistant Examiner* — Christopher J Clark
(74) *Attorney, Agent, or Firm* — Greenberg Traurig, LLP

(57) ABSTRACT

A method includes energizing a transformer from a deenergized state by turning on a solid-state transfer switch to conductively couple a power source on a first side of the solid-state transfer switch and a transformer on a second side of the solid-state transfer switch, and evaluating an inrush current to the transformer from the power source. The method includes turning off the solid-state transfer switch to conductively decouple the power source and the transformer in response to the inrush current meeting a first criterion, determining a recoupling timing for the solid-state transfer switch, and turning on the solid-state transfer switch in response to the recoupling timing effective to complete energization of the transformer with the inrush current to the transformer being limited by the first criterion.

20 Claims, 7 Drawing Sheets

(56) References Cited

U.S. PATENT DOCUMENTS

| | | | |
|---|---|---|---|
| 2004/0130835 A1* | 7/2004 | Wahlroos | H01H 9/56 361/2 |
| 2007/0121257 A1 | 5/2007 | Maitra et al. | |
| 2009/0134862 A1* | 5/2009 | Kinoshita | H02H 9/002 323/361 |
| 2014/0132080 A1 | 5/2014 | Bush et al. | |
| 2014/0168846 A1* | 6/2014 | Maruyama | H02H 9/002 361/166 |
| 2016/0204654 A1 | 7/2016 | Mondal et al. | |
| 2017/0126006 A1 | 5/2017 | Pfitzer et al. | |

OTHER PUBLICATIONS

International Search Report and Written Opinion; issued by the European Patent Office; regarding the corresponding patent application Serial No. PCT/IB2022/006047; dated May 16, 2022; 13 pages.

* cited by examiner

INRUSH CURRENT LIMITING TRANSFORMER ENERGIZATION APPARATUSES, METHODS, SYSTEMS, AND TECHNIQUE

BACKGROUND

The present application relates to inrush current limiting transformer energization apparatuses, methods, systems, and techniques. When a transformer is first energized or reenergized after an interruption, it may draw a high inrush current exceeding the rated system current. In a number of applications and systems, such high inrush currents may approach or exceed fault protection trip levels and may highly stress or damage other components coupled with the transformer. Conventional proposals for transformer energization suffer from a number of disadvantages and shortcomings. Some proposals operate a bypass switch to close a current path bypassing a main thyristor switch, which is kept off until the transformer is energized, at which time the main thyristor switch is turned on and the bypass switch is opened. The bypass switch may be configured to withstand higher inrush currents than the main thyristor switch; however, the transformer may still draw a high inrush current, risking or causing fault protection tripping and stressing or damaging other system components. Some proposals energize the transformer using a main thyristor switch by initially firing one or more thyristors with small phase angles and thereafter gradually increasing the firing phase angle over multiple voltage cycles until the transformer is fully energized. Such proposals provide some control over inrush current; however, they are slow, requiring multiple voltage cycles to energize the transformer, and also require complex and potentially error-prone control algorithm. There remains a significant need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Unique apparatuses, methods, systems, and techniques of limiting inrush currents during transformer energization are disclosed. Multiple embodiments, forms, objects, features, advantages, aspects, and benefits of the disclosure shall become apparent from the following description and drawings.

DETAILED DESCRIPTION OF EXAMPLE EMBODIMENTS

Figure 1:
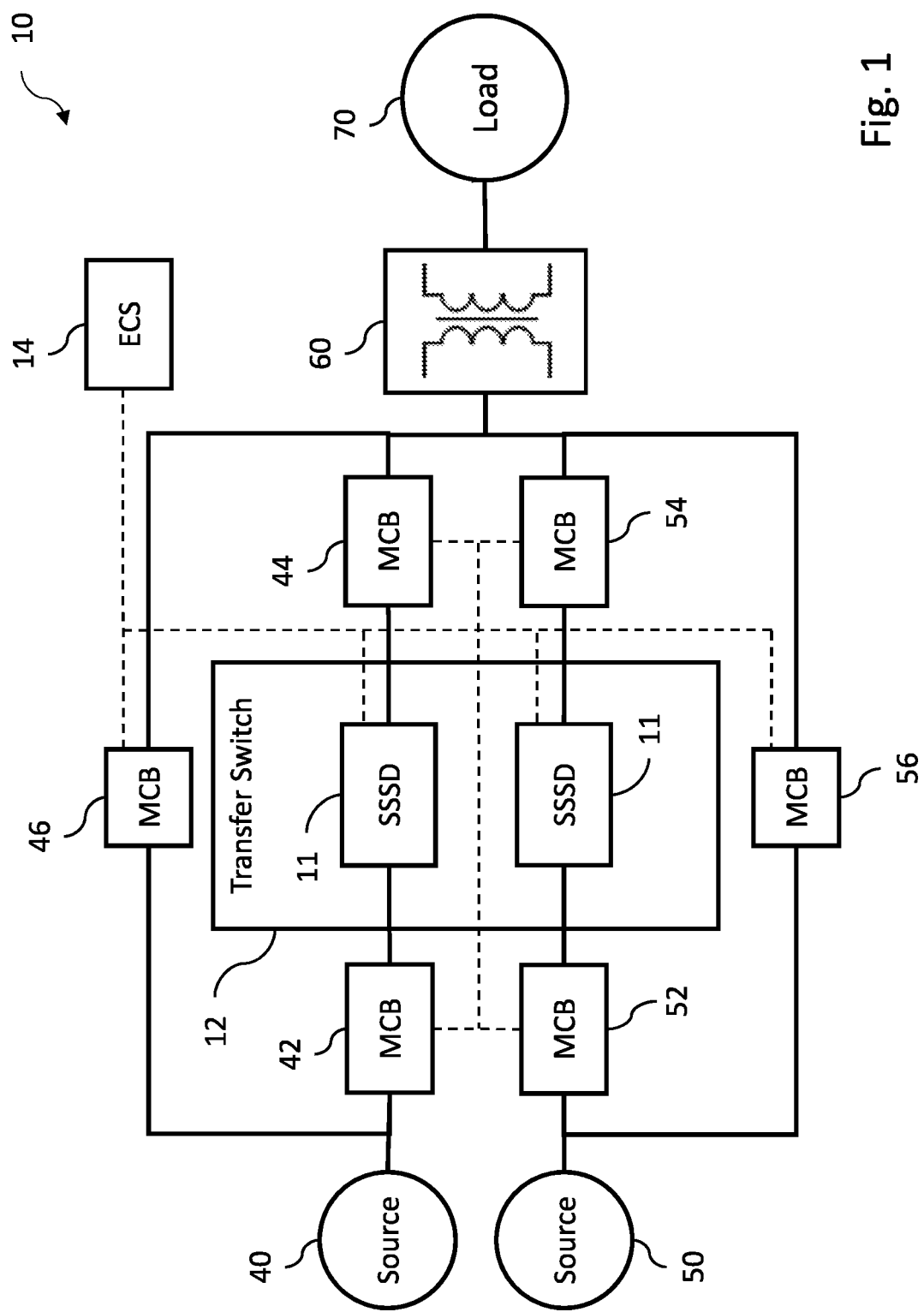
FIG. 1 is a schematic diagram illustrating certain aspects of an example system.

With reference to FIG. 1, there is illustrated schematic diagram depicting certain aspects of an example system 10. The system 10 comprises a first electrical power source 40 (also referred to herein as source 40) which is conductively coupled with a transfer switch 11 via a first mechanical circuit breaker (MCB) 42, and a second electrical power source 50 (also referred to herein as source 50) which is conductively coupled with the transfer switch 11 via a second MCB 52. The system 10 further comprises a transformer 60 including a primary side which is conductively coupled with the transfer switch 11 via a third MCB 44 and a fourth MCB 54, and a secondary side which is conductively coupled with a load 70.

The first source 40 and the second source 50 may be a number of forms and types of electrical power sources, for example, a utility grid, a microgrid, a nanogrid, a backup generator, an uninterruptable power supply (UPS) or backup battery, a flywheel operatively coupled with a motor/generator, a PV array, a wind farm, a fuel cell installation, or any of a number of other sources of electrical power as will occur to one of skill in the art with the benefit of the present disclosure. One of the first source 40 and the second source 50 may be a primary or preferred power source for the system 10 and the other of the first source 40 and the second source 50 may be a secondary or backup power source for the system 10. In some example forms, the first source may comprise a utility grid serving as a primary power source and the second source 50 may comprise one or more UPS serving as a backup power source. In some forms, the transfer switch 11 may also be considered and referred to as a bypass switch or a UPS bypass switch. The load 70 may be any of a variety of types of load systems, for example, a datacenter, educational facility, governmental facility, hospital or other healthcare facility, manufacturing, chemical or other industrial plant, water treatment plant, or other types of loads or load systems as will occur to one of skill in the art with the benefit of the present disclosure.

The MCB 42, 44, 52, 54 are configured and operable to provide fault protection by transitioning from a closed-circuit state to an open-circuit state in response to a fault condition, such as an over-current condition, an over-voltage condition, and/or another fault condition. Furthermore, the MCB 42, 44, 52, 54 may be configured and operable to provide passive fault protection, active fault protection, or other active opening or closing operation (e.g., in response to control signals received from the electronic control system (ECS) 14), or both. It shall be appreciated that certain embodiments may omit one or more of the MCB 42, 44, 52, 54. Furthermore, certain embodiments may comprise additional or alternate fault protection devices as will occur to one of skill in the art with the benefit of the present disclosure.

The system 10 also comprises a fifth MCB 46 which is conductively coupled between the first source 40 and the transformer 60, and a sixth MCB 56, which is conductively coupled between the second source 50 and the transformer 60. The MCB 46, 56 are configured to selectably provide a closed circuit connection between the first source 40 and the second source 50, respectively, bypassing the transfer switch 11 and may be actively controlled by the ECS 14. It shall be appreciated that certain embodiments may omit one or both of the MCB 46, 56. Furthermore, certain embodiments may comprise additional or alternate bypass devices as will occur to one of skill in the art with the benefit of the present disclosure.

The ECS 14 is operatively coupled with the transfer switch 11 and, as illustrated in FIG. 1, may in some forms also be operatively coupled with one or more of the MCB 42, 44, 46, 52, 54, 56 and may monitor and/or actively control one or more of the MCB 42, 44, 46, 52, 54, 56. The ECS 14 may be provided as a portion or component of the transfer switch 11 (e.g., provided in a common housing or as a common unit), as one or more separate components, or distributed among one or more components forming a portion of the transfer switch 11 and one or more separate components. The ECS may include one or more integrated circuit-based (e.g., microprocessor-based, microcontroller-based, ASIC-based, FPGA-based, and/or DSP-based) control units as well as related driver, input/output, signal conditioning, signal conversion, non-transitory machine-readable memory devices storing executable instructions, and other circuitry.

The transfer switch 11 is configured as a static transfer switch comprising one or more solid-state switching devices (SSSD) 11 which can be controlled to energize (or deenergize) the transformer 60 by conductively coupling (or decoupling) the transformer 60 with either the first source 40 or the second source 60. In the example of FIG. 1, two SSSD 11 provided One of the SSSD 11 is controllable by the ECS 14 to an on or closed state which conductively couples the first source 40 with the transformer 60 (provided that the MCB 42, 44 are in a closed state) and to an off or open state which conductively decouples the first source 40 with the transformer 60. Another of the SSSD 11 is controllable by the ECS 14 to an on or closed state which conductively couples the second source 50 with the transformer 60 (provided that the MCB 52, 54 are in a closed state) and to an off or open state which conductively decouples the second source 50 with the transformer 60. The SSSD 11 may be provided in a number of configurations and forms including, for example, the forms illustrated and described below in connection with FIGS. 2 and 3.

It shall be appreciated that system 10 may be provided in a single-phase form, a three-phase form, or other multi-phase forms. Such multi-phase forms, the first source 40 and the second source 50 may be multi-phase power sources (e.g., three-phase power sources). In such forms, the MCB 42, 44, 46, 52, 54, 56, the transfer switch 11 and its constituent SSSD 11, and the transformer, may be provided in corresponding multi-phase forms and arrangements (e.g., three-phase forms and arrangements) wherein an additional instance of these components may be provided to service each additional phase. Furthermore, while system 10 is illustrated as comprising a first source 40 and a second source 50, it shall be appreciated that or more additional sources may also be present in certain forms and that such additional sources may include additional respective MCB components for fault protection and bypass operation and additional respective constituent SSSD 11 of the transfer switch 11.

Figure 2:
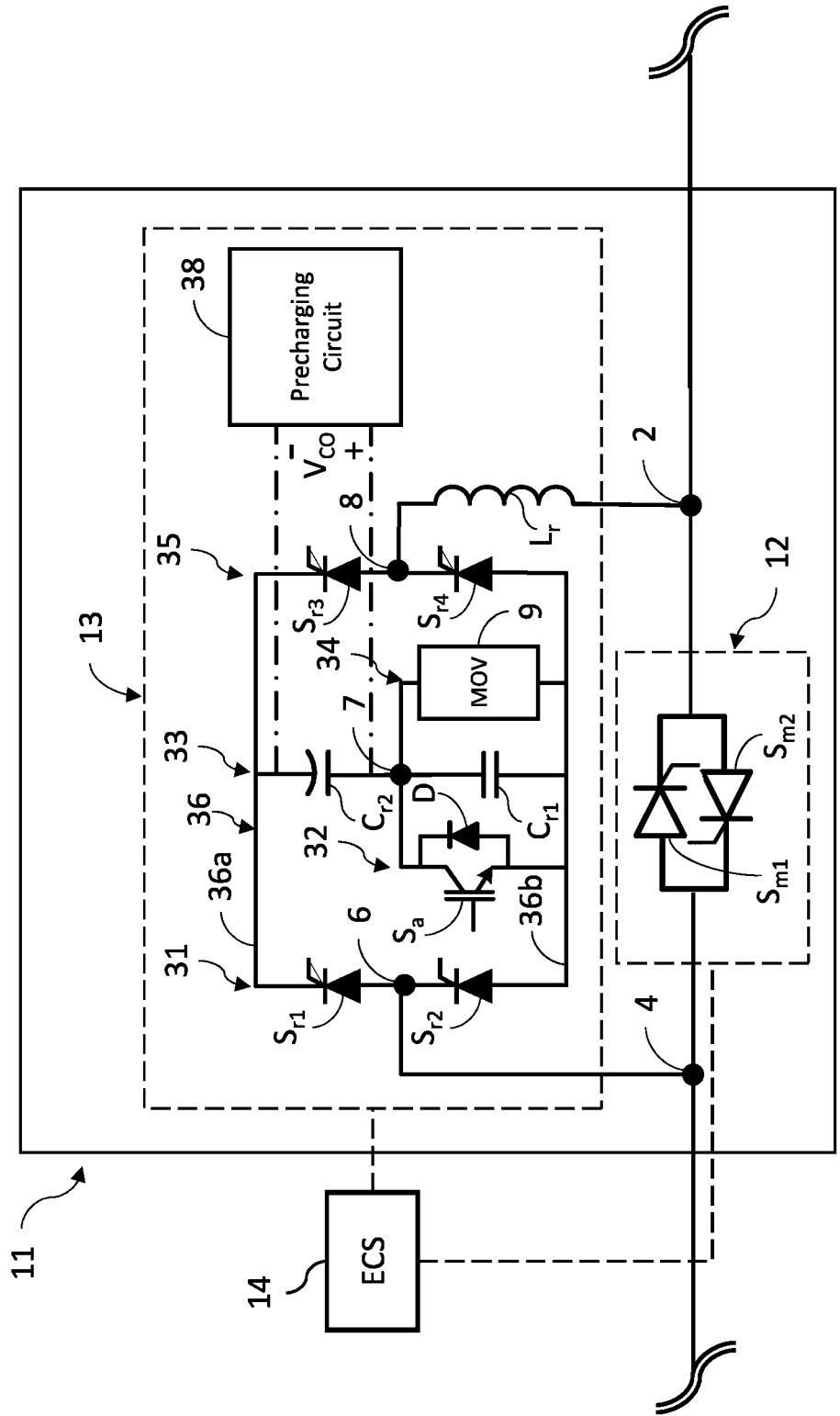
FIG. 2 is a schematic diagram illustrating certain aspects of an example solid-state switching device arrangement.

With reference to FIG. 2, there is illustrated a schematic diagram depicting certain aspects of an example form of the SSSD 11. In the form of FIG. 2, the SSSD 11 includes a first terminal 2, a terminal 4, a main switching device 12, and a resonant turn-off (RTO) circuit 13. The main switching device 12 is conductively coupled with the terminal 2, which is, in turn, conductively coupled to a power source such as the first source 40 or the second source 50, as illustrated in FIG. 1. The main switching device 12 is also conductively coupled with the terminal 4 which is, in turn, conductively coupled with the transformer 60, as illustrated in FIG. 1. The main switching device 12 includes a thyristor $S_{m1}$ coupled in an anti-parallel configuration with thyristor $S_{m2}$. The thyristors $S_{m1}$, $S_{m2}$ of the main switching device 12 may include silicon controlled thyristors, gate turn-off thyristors, emitter turn-off thyristors, reverse conducting thyristors, bidirectional triode thyristors, integrated gate commutated thyristors, or reverse-blocking integrated gate commutated thyristors, to name several examples.

RTO circuit 13 is conductively coupled with terminal 2 and terminal 4 in parallel with main switching device 12 and is structured to receive power and output a resonant current to main switching device 12. RTO circuit 13 includes a plurality of legs 31, 33 and, 35 coupled across a bus 36. It shall be appreciated that RTO circuit 13 is one example of a resonant circuit according to the present disclosure. Other embodiments may include a number of additions, modifications, or alternative resonant circuit arrangements including different types and arrangements of legs, switching devices, and capacitors.

Leg 31 includes a first RTO switching device $S_{r1}$ coupled in series with a second RTO switching device $S_{r2}$ at a midpoint connection 6 (also referred to as an input/output (I/O) port 6) which is coupled to terminal 4. The first RTO switching device $S_{r1}$ is coupled with a first rail 36a of the bus 36 and the second RTO switching device $S_{r2}$ is coupled with a second rail of the bus 36. Leg 35 includes a third RTO switching device $S_{r3}$ coupled in series with a fourth RTO switching device $S_{r4}$ at a midpoint connection 8 (also referred to as input/output (I/O) port 8). The third RTO switching device $S_{r3}$ is coupled with the first rail 36a of the bus 36 and the fourth RTO switching device $S_{r4}$ is coupled with the second rail 36b of the bus 36. In the illustrated embodiment, the RTO switching devices $S_{r1}$, $S_{r2}$, $S_{r3}$, $S_{r4}$ comprise thyristors. In other embodiments, the RTO switching devices $S_{r1}$, $S_{r2}$, $S_{r3}$, $S_{r4}$ may comprise other types of semiconductor switching devices such as insulated gate bipolar transistors (IGBT). Legs 31 and 35 are structured to receive AC power, convert the received power to DC power, output the DC power to bus 36, and convert the DC power of the bus 36 to AC power.

Leg 33 includes a first resonant capacitor $C_{r1}$ coupled in series with a second resonant capacitor $C_{r2}$ at a midpoint connection 7. The first resonant capacitor $C_{r1}$ is coupled with the first rail 36a of the bus 36 and the second resonant capacitor $C_{r2}$ is coupled with the second rail 36b of the bus 36. A pre-charging circuit 38 is configured and operable to pre-charge the second resonant capacitor $C_{r2}$ to a voltage reference value $V_{CO}$. A first branch 32 is coupled the second rail 36b of the bus 36 and the midpoint connection 7 and includes an auxiliary switching device Sa coupled in anti-parallel with a freewheeling diode D. A second branch 34 is coupled the second rail 36b of the bus 36 and the midpoint connection 7 and includes a voltage clamping device (also referred to herein as a voltage clamp) which provides unipolar voltage clamping across the first resonant capacitor $C_{r1}$. In the embodiment of FIG. 1, the voltage clamp is a metal oxide varistor (MOV) 9. Other embodiments may include other types or arrangements of voltage clamps. A resonant inductor $L_r$ is coupled between the midpoint connection 8 and the terminal 2 and limits the time rate of change of current (di/dt) for softer commutation. Some forms may additionally or alternatively include another resonant inductor coupled between midpoint connection 6 and terminal 4.

The SSSD 11 is structured to open in response to control signals or commands received from the ECS 14. To reduce the time necessary for opening the main switching device 12, the RTO circuit 13 is configured and operable to output a resonant current to the main switching device 12 to force the commutation of the main switching device 12. The RTO circuit 13 may thereby increase the speed at which the SSSD 11 operates to open the main switching device 12 (e.g., 80% faster compared to the same SSSD 11 without the RTO circuit 13). Further details of the operation and control of the RTO circuit 13 and main switching device 12 of the SSSD 11 may be found in International Application No. PCT/US20/64217, filed Dec. 10, 2020, the disclosure of which is hereby incorporated by reference. It shall be appreciated that the SSSD 11 is one example of an SSSD which is quasi-fully controllable by assisted or forced commutation allowing a thyristor or other semi-controllable device, which can be turned off under only certain conditions (e.g., zero current conditions) to function as a fully controlled device via the assisted or forced commutation.

The ECS 14 is operatively coupled with main switching device 12 and is configured and operable to provide control signals to the thyristor $S_{m1}$ and the thyristor $S_{m2}$ to selectably turn each of these devices on (e.g., a closed or conductive state) or off (e.g., an open or non-conductive state). The ECS 14 is also operatively coupled with the RTO circuit 13 and is configured and operable to provide control signals to the RTO switching device $S_{r1}$, RTO switching device $S_{r2}$, RTO switching device $S_{r3}$, and RTO switching device $S_{r4}$ to selectably turn each of these devices on (e.g., a closed or conductive state) or off (e.g., an open or non-conductive state). The ECS 14 is also configured and operable to receive one or more inputs indicative of voltage, current, and/or flux values at one or more nodes of system 10 and to control system 10 as further described herein.

The ECS 14 operates the RTO circuit 13 to generate and provide a resonant current (IR) configured and operable to force commutation of the main switching device 12. The resonant current (IR) causes the magnitude of the current conducted by main switching device 12 to decrease to zero and causes a reverse voltage bias across the main switching device 12. A pre-charging circuit 38 may be provided in some forms, such as the form illustrated in FIG. 2, and the ECS 14 may also be structured to control pre-charging circuit 38 to pre-charge the second resonant capacitor $C_{r2}$ and discharge the second resonant capacitor $C_{r2}$ based on a voltage reference value.

It shall be appreciated that the RTO circuit 13 is one example of a resonant circuit that may be coupled in parallel with a thyristor-based SSSD such as SSSD 11 and utilized to increase a thyristor turn-off speed by injecting a reverse current to force the thyristor current to commutate to zero. Using RTO circuit or other forms of parallel resonant circuits, thyristor-based forms the main switching device 12 can interrupt the current quickly (e.g., within 1 ms). This is much shorter than the thyristor turn-off time which could be a half cycle or more of the source fundamental frequency (e.g., 8.3 ms in 60 Hz ac system).

Figure 3:
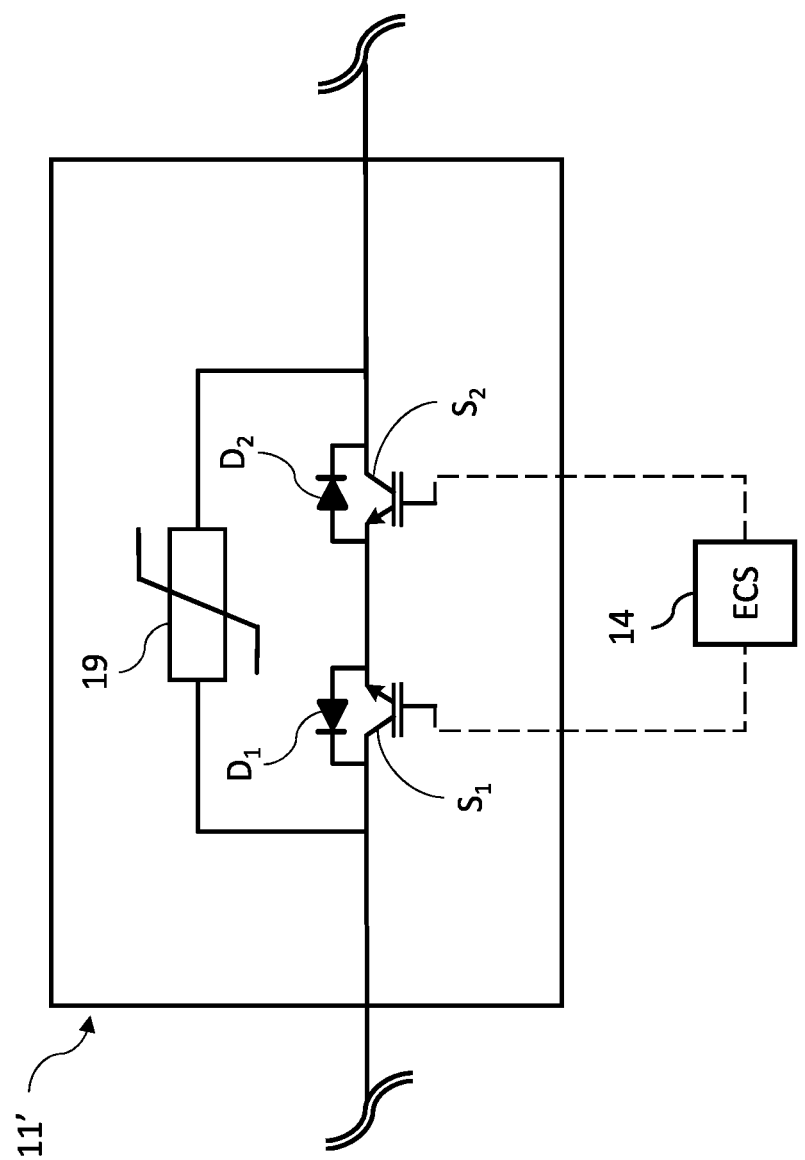
FIG. 3 is a schematic diagram illustrating certain aspects of another example solid-state switching device arrangement.

With reference to FIG. 3, there is illustrated a schematic diagram depicting certain aspects of an example form of an SSSD 11' which may be utilized in the system 10 as an alternative to the form of SSSD 11 illustrated in FIG. 2. In the form of FIG. 3, the SSSD 11' uses fully controlled power semiconductor switching devices $S_1$, $S_2$ coupled in an anti-series relationship with one another and respectively coupled in an anti-parallel relationship with diodes $D_1$, $D_2$. A voltage clamp 19 is coupled in parallel across the uses fully controlled power semiconductor switching devices $S_1$, $S_2$. In contrast to the thyristors $S_{m1}$, $S_{m2}$ of the SSSD 11, the fully controlled power semiconductor devices $S_1$, $S_2$ are can be turned ON or OFF by the gate signals under any operating conditions without requiring turn-off commutation such as provided by the RTO circuit 13. The fully controlled power semiconductor devices of the SSSD 11', such as $S_1$, $S_2$, may comprise silicon devices or wide bandgap (WBG) devices (e.g., SiC or GaN devices) or devices based on other materials. In some forms, the fully controlled power semiconductor devices $S_1$, $S_2$ may comprise gate turn off thyristors (GTOs), MOS controlled thyristors (MCTs), integrated gate-commutated thyristors (IGCTs), insulated-gate bipolar transistors (IGBTs), metal-oxide-semiconductor field-effect transistors (MOSFETs), junction field-effect transistors (JFETs), or other types of fully controllable switching devices as will occur to one of skill in the art with the benefit of the present disclosure. While two fully controlled power semiconductor switching devices $S_1$, $S_2$ are illustrated in the example of FIG. 3, it shall be appreciated that other numbers and arrangements of fully controlled power semiconductor switching devices may be utilized, for example, a single or multiple bidirectional or inherently-reverse-blocking fully controlled power semiconductor switching devices may be utilized in some forms, and other series, parallel, or parallel-series arrangements of fully controlled power semiconductor switching devices may be utilized in some forms.

When the transformer 60 is energized from a deenergized state (e.g., when the transformer 60 is first energized after a shutdown event or when the transformer 60 is reenergized after a power interruption such as a power cut or power outage) the transformer 60 may draw high inrush current from one or more of the first source 40, the second source 50, or another source with which it is coupled. Such elevated inrush current may occur at least in part due to the core magnetization or flux of the transformer 60 being out of sync or out of phase with the voltage of the source supplying power to the transformer 60. In a number of applications and systems, including those described herein, the inrush current to the transformer during the transformer energization may be tens of times of the system rated current, approaching or exceeding the short-circuit protection levels and tripping the protection circuit breakers (e.g., MCB 42, 44, 52, 54) to open. Inrush current of such magnitude can also heavily stress the upstream power supply components such as uninterrupted power supply (UPS) components and may cause such components to malfunction or fail.

Figure 5:
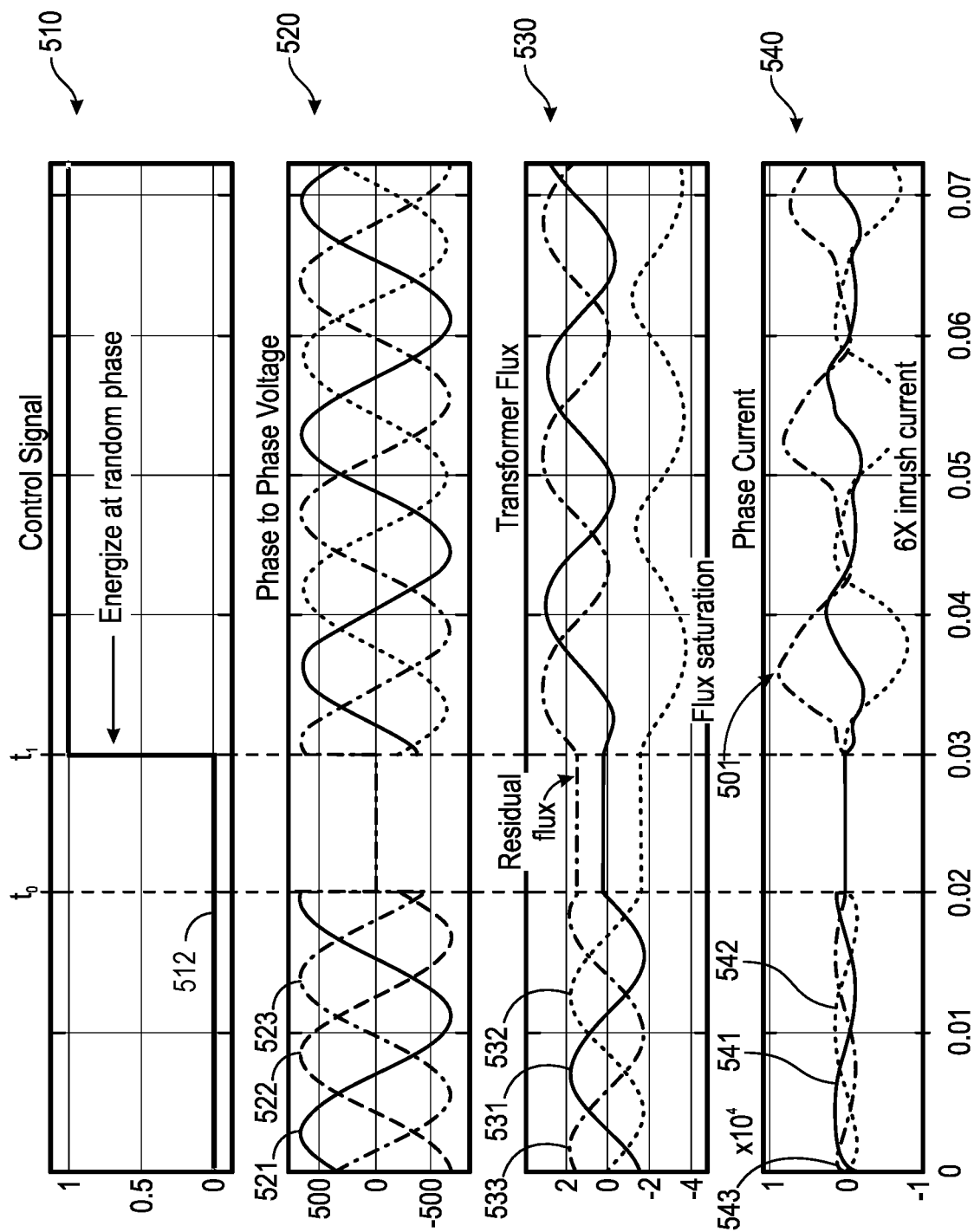
FIG. 5 is a set of graphs illustrating certain aspects of a transformer energization operation during an example operating scenario without use of an inrush current limiting technique according to the present disclosure.

With reference to FIG. 5, there is illustrated a set of graphs 510, 520, 530, 540 depicting an example of an energization of a transformer with uncontrolled inrush current. Graph 510 illustrates a control signal 512 which is provided to control the operation of an SSSD such as SSSD 11, SSSD 11' or another SSSD as may be provided in a system such as the system 10 or another system wherein a transformer is energized by an SSSD. Graph 520 illustrates waveforms of phase voltages 521, 522, 523 of a three-phase power source as a function of time. Graph 530 illustrates waveforms of transformer phase fluxes 531, 532, 533 of a three-phase transformer operatively coupled with the three-phase power source as a function of time. Graph 540 illustrates waveforms of phase currents 541, 542, 543 flowing from the three-phase power source to the three-phase transformer as a function of time. At time $t_0$, a power supply to the transformer is interrupted, the phase voltages 521, 522, 523 and phase currents 541, 542, 543 drop to zero, and the transformer phase fluxes 531, 532, 533 stop changing at arbitrary levels and remain at substantially the same arbitrary level for at least some period of time thereafter. At time $t_1$, a power supply to the transformer is reestablished and the transformer phases are energized at random source voltage phase angles. The unknown residual flux in the transformer is mismatched and is saturated. High inrush current 501 (about 6 times the rated current in the illustrated example) is drawn due to the mismatched flux saturation.

Figure 4:
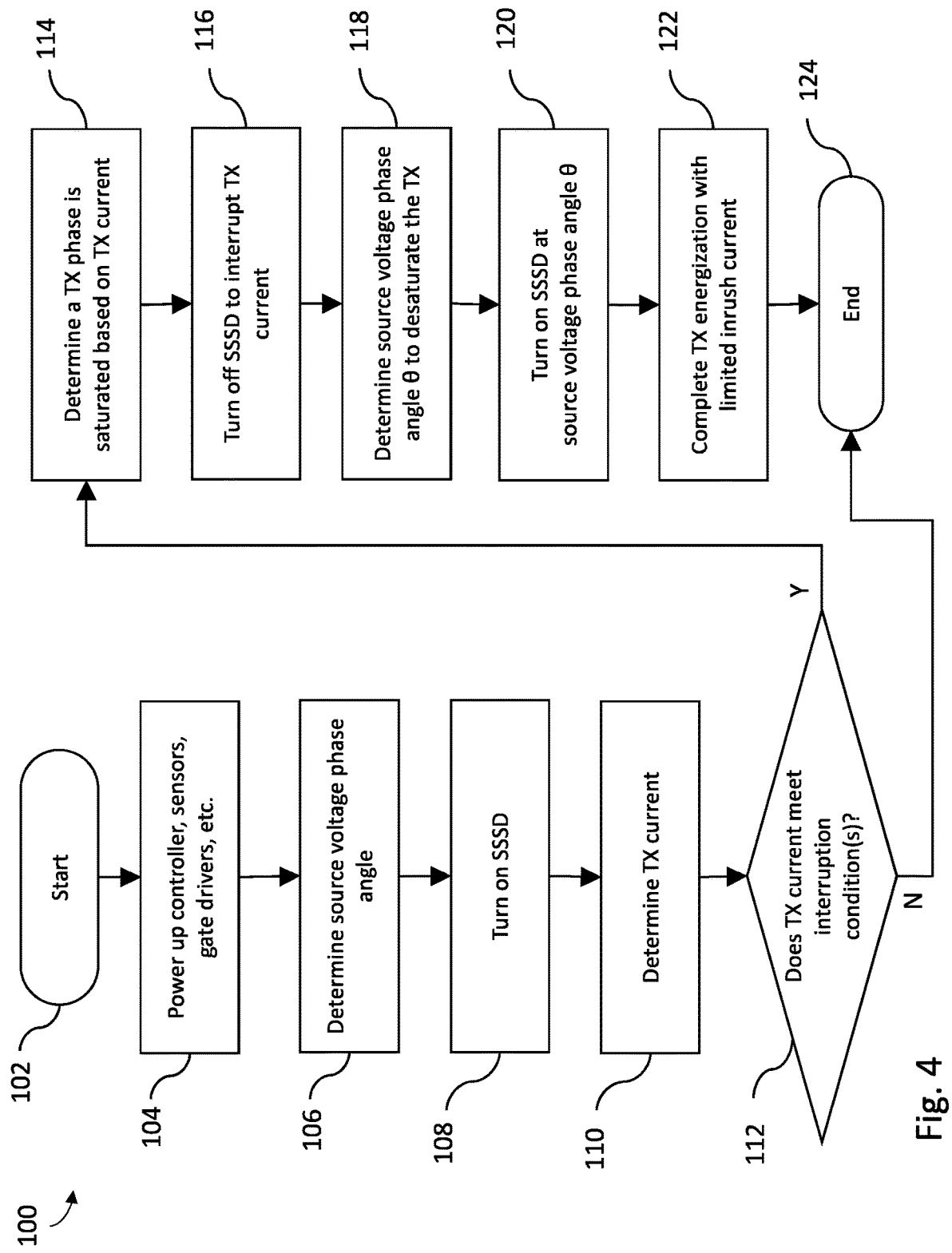
FIG. 4 is a flow diagram depicting certain aspects of an example process.

With reference to FIG. 4, there is illustrated a flow diagram depicting certain aspects of an example process 100 for energizing a transformer. Process 100 provides one example of a process of energizing a transformer from a deenergized state wherein the transformer can be fully energized within one source voltage cycle with limited inrush current. Process 100 will be described as being performed in connection with the transformer 60, the ECS 14, the transfer switch 11, and other components of the system 10. It shall nevertheless be appreciated that process 100 may be performed in connection with other systems including other transformers, ECS, transfer switches, and components.

Process 100 begins at start operation 102 and proceeds to operation 104 which powers on one or more components of the ECS 14 (e.g., controller(s), sensors(s), gate driver(s), or other ECS components). From operation 102, process 100 proceeds to operation 106 which determines a voltage phase angle of a source, such as the first source 40 or the second source 50. The voltage phase angle may be determined using phase-locked loop (PLL) detection or other detectors and detection techniques as will occur to one of skill in the art with the benefit of the present disclosure. It shall be appreciated that the terms determine, determines, determining and grammatical variants thereof refer to and encompass a number of techniques which may be performed by an electronic control system including, for example, calculation or computation, estimation or approximation, simulation or modeling, lookup operations, matrix operations, Boolean or other mathematical operations, other electronic control system operations and techniques, or combinations thereof.

From operation 106, process 100 proceeds to operation 108 which turns on one or more of the SSSD 11 (or the SSSD 11' or other SSSD) of the transfer switch 11. From operation 108, process 100 proceeds to operation 110 which determines a transformer inrush current of each phase of the transformer 60 (e.g., a current drawn by, flowing to, or flowing through a phase of the transformer 60), for example, by receiving a measurement signal from one or more current sensors associated with the transformer phases or using other techniques as will occur to one of skill in the art with the benefit of the present disclosure.

From operation 110, process 100 proceeds to conditional 112 which evaluates whether a transformer inrush current of any phase of the transformer 60 meets an interruption condition. The interruption condition may comprise evaluating whether a transformer meets or exceeds a threshold, meets or exceeds a threshold for a minimum duration, or other techniques as will occur to one of skill in the art with the benefit of the present disclosure. Such thresholds and durations may be predetermined values or may be calibratable or adjustable values that can be varied or reconfigured. The threshold may be set in relation to a rated current for the system, for example, 1.5 to 2 times a rated current or another multiple of or ratio or a rated current. It shall be appreciated that the interruption condition is one example of a first criterion against which the transformer inrush current may be evaluated and that other embodiments may comprise additional or alternate criteria.

If conditional 112 evaluates that a transformer inrush current of each phase of the transformer 60 does not meet one or more interruption condition(s), process 100 proceeds to end operation 124. Thus, if the SSSD 11 (or the SSSD 11' or other SSSD) of the transfer switch 11 happens to turn on at an acceptable voltage phase angle, and the transformer flux is thereby acceptably matched, the transformer will be fully energized with limited inrush current without requiring further action, operation, or intervention by process 100.

If conditional 112 evaluates that a transformer inrush current of any phase of the transformer 60 meets one or more interruption criteria or condition(s), process 100 proceeds to operation 114 which determines a phase or multiple phases of the transformer that is or are saturated based on the transformer inrush current of a respective phase. In the case of a single-phase form of system 10, the determination of a phase may be implicit in an identification of one or more interruption criteria. From operation 114, process 100 proceeds to operation 116 which turns off the SSSD 11 (or the SSSD 11' or another SSSD) associated with the saturated transformer phase effective to interrupt the transformer inrush current of the saturated phase.

From operation 116, process 100 proceeds to operation 118 which determines a source voltage phase angle (θ) effective to desaturate a saturated phase of the transformer 60. Such determination may be made by determining a phase angle or timing to align the source voltage phase with the flux phase angle of the saturated transformer phase in accordance with the control process and technique described below or using other techniques as will occur to one of skill in the art with the benefit of the present disclosure. It shall be appreciated that references herein to phase angle or determining a phase angle include and encompass phase domain values or determinations thereof as well as time domain values or determination thereof and frequency domain values or determination thereof. Similarly, references herein to timing or determining a timing include and encompass time domain values or determination thereof as well as phase domain values or determinations thereof and frequency domain values or determination thereof.

The relationship between flux and source voltage for a transformer having three phases (A, B, and C) is given by and can be determined based on equations (1)-(6):

(1) $\phi_{AB,40} = \int v_{AB,40}(t)dt$, where $\phi_{AB,40}$ is the difference between the flux of phase A and the flux of phase B of the transformer 60 for the source 40, and $v_{AB,40}$ is the difference between the voltage of phase A and the voltage of phase B of the transformer 60 for the source 40.

(2) $\phi_{BC,40} = \int v_{BC,40}(t)dt$, where $\phi_{BC,40}$ is the difference between the flux of phase B and the flux of phase C of the transformer 60 for the source 40, and $v_{BC,40}$ is the difference between the voltage of phase B and the voltage of phase C of the transformer 60 for the source 40.

(3) $\phi_{CA,40} = \int v_{CA,40}(t)dt$, where $\phi_{CA,40}$ is the difference between the flux of phase C and the flux of phase A of the transformer 60 for the source 40, and $v_{CA,40}$ is the difference between the voltage of phase C and the voltage of phase A of the transformer 60 for the source 40.

(4) $\phi_{AB,50} = \int v_{AB,50}(t)dt$, where $\phi_{AB,50}$ is the difference between the flux of phase A and the flux of phase B of the transformer 60 for the source 50, and $v_{AB,50}$ is the difference between the voltage of phase A and the voltage of phase B of the transformer 60 for the source 50.

(5) $\phi_{BC,50} = \int v_{BC,50}(t)dt$, where $\phi_{BC,50}$ is the difference between the flux of phase B and the flux of phase C of the transformer 60 for the source 50, and $v_{BC,50}$ is the difference between the voltage of phase B and the voltage of phase C of the transformer 60 for the source 50.

(6) $\phi_{CA,50} = \int v_{CA,50}(t)dt$, where $\phi_{CA,50}$ is the difference between the flux of phase C and the flux of phase A of the transformer 60 for the source 50, and $v_{CA,50}$ is the difference between the voltage of phase C and the voltage of phase A of the transformer 60 for the source 50.

In accordance with equations (1)-(6), a desaturation voltage phase angle (θ) may be determined based on the saturated phase of a transformer. In one example, assuming phase AB of the transformer is positively saturated (positive transformer inrush current), then the voltage angle $180° < \theta_{AB} < 360°$ ($V_{AB} < 0$), should be selected to desaturate the transformer flux. Similarly, if phase AB of the transformer is negatively saturated (negative transformer inrush current), then the voltage angle $0° < \theta_{AB} < 180°$ ($V_{AB} > 0$), may be selected to desaturate the transformer 60 flux. Similar controls may also be applied to other transformer phases, such as phase BC and phase CA in the case of a three-phase transformer. Further aspects of an example determination of a desaturation voltage phase angle (θ) are disclosed below in connection with FIG. 7

From operation 118, process 100 proceeds to operation 120 which turns on the SSSD 11 (or the SSSD 11') at source voltage phase angle θ. The timing of the turn-on operation may be considered to involve a delay or waiting period such that the source voltage phase angle θ is in phase with the flux phase angle of the saturated phase do the transformer 60 effective to desaturate the saturated phase. From operation 120, process 100 proceeds to operation 122 which completes the energization of the transformer 60 with the transformer inrush current being limited. In some forms, the transformer inrush current is limited by the interruption condition (e.g., to a magnitude less than or less than or equal to a threshold establishing the interruption condition). From operation 122, process 100 proceeds to end operation 124.

Figure 6:
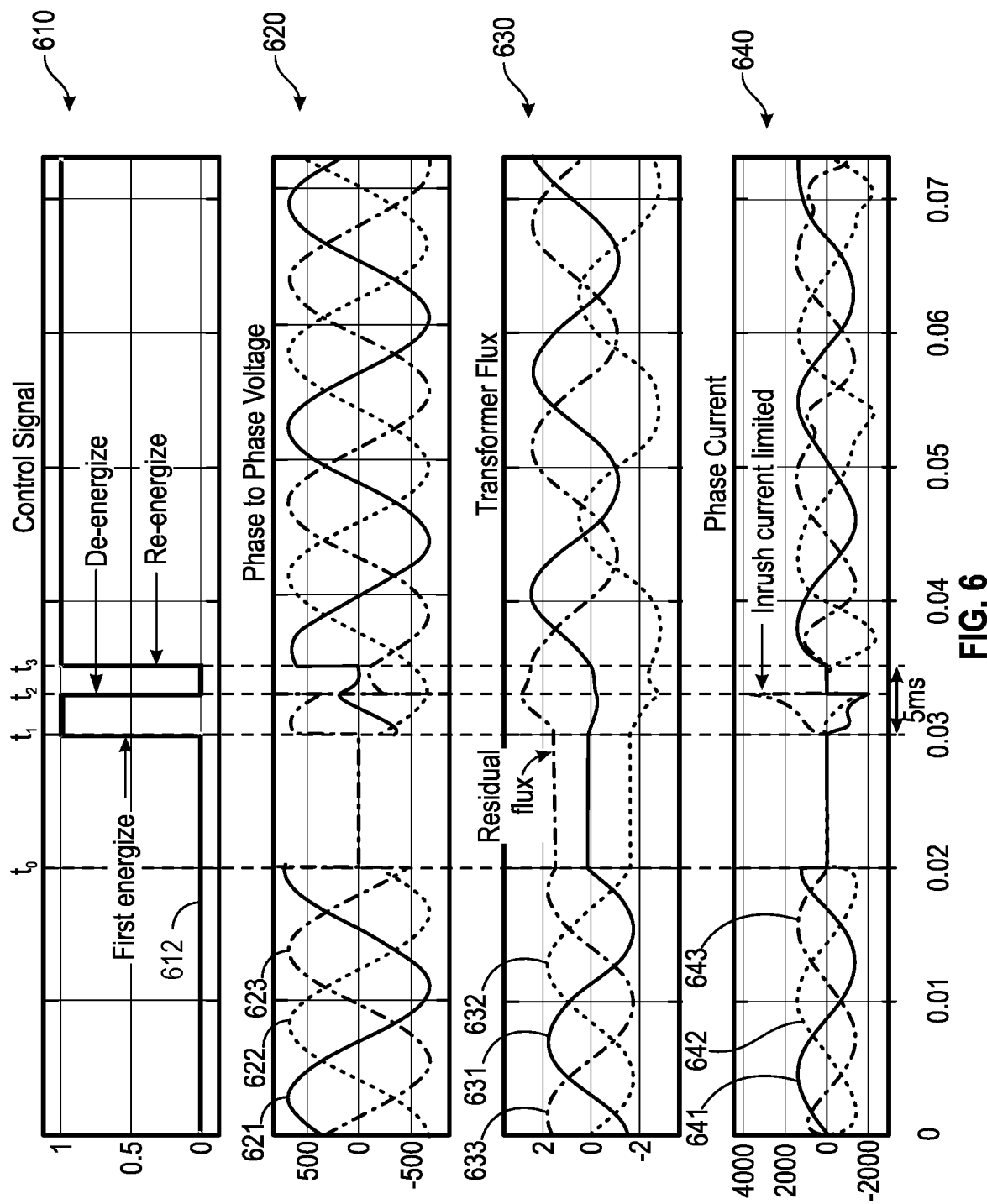
FIG. 6 is a set of graphs illustrating certain aspects of a transformer energization operation during another operating scenario with use of an inrush current limiting technique according to the present disclosure.

With reference to FIG. 6, there is illustrated a set of graphs 610, 620, 630, 640 depicting an example of an energization of transformer 60 with controlled inrush current. Graph 610 illustrates a control signal 612 which is provided to control operation of an SSSC such as SSSD 11, SSSD 11' or another SSSD as may be provided in a system such as the system 10 or another system wherein a transformer is energized. Graph 620 illustrates waveforms of phase voltages 621, 622, 623 of a three-phase power source as a function of time. Graph 630 illustrates waveforms of transformer phase fluxes 631, 632, 633 of a three-phase transformer operatively coupled with the three-phase power source as a function of time. Graph 640 illustrates waveforms of phase currents 641, 642, 643 flowing from the three-phase power source to the three-phase transformer as a function of time.

At time $t_0$, a power supply to the transformer is interrupted, the phase voltages 621, 622, 623 and phase currents 641, 642, 643 drop to zero, and the transformer phase fluxes 631, 632, 633 stop changing at arbitrary levels and remain at substantially the same arbitrary level for at least some period of time thereafter. At time $t_1$, a power supply to the transformer is reestablished by the SSSD 11, SSSD 11', or another SSSD, and the transformer phases are energized at random voltage phase angles. After reestablishing the power supply, the inrush current of one or more phases of the transformer may gradually increase as the flux in the transformer starts to enter a saturation region. Before the inrush current rises too high (e.g., 1.5 to 2 times the rated current), the SSSD 11, SSSD 11', or another SSSD interrupts the inrush current at $t_2$. Based on the inrush current(s), the ECS 14 can derive which phase of the transformer flux is in saturation. The transformer is then reenergized at $t_3$ by the SSSD 11, SSSD 11', or another SSSD at the right voltage phase angle to desaturate the transformer flux, avoiding generating the high inrush current. The total transformer energizing process can be completed within one voltage cycle (5 ms in the illustrated example).

Figure 7:
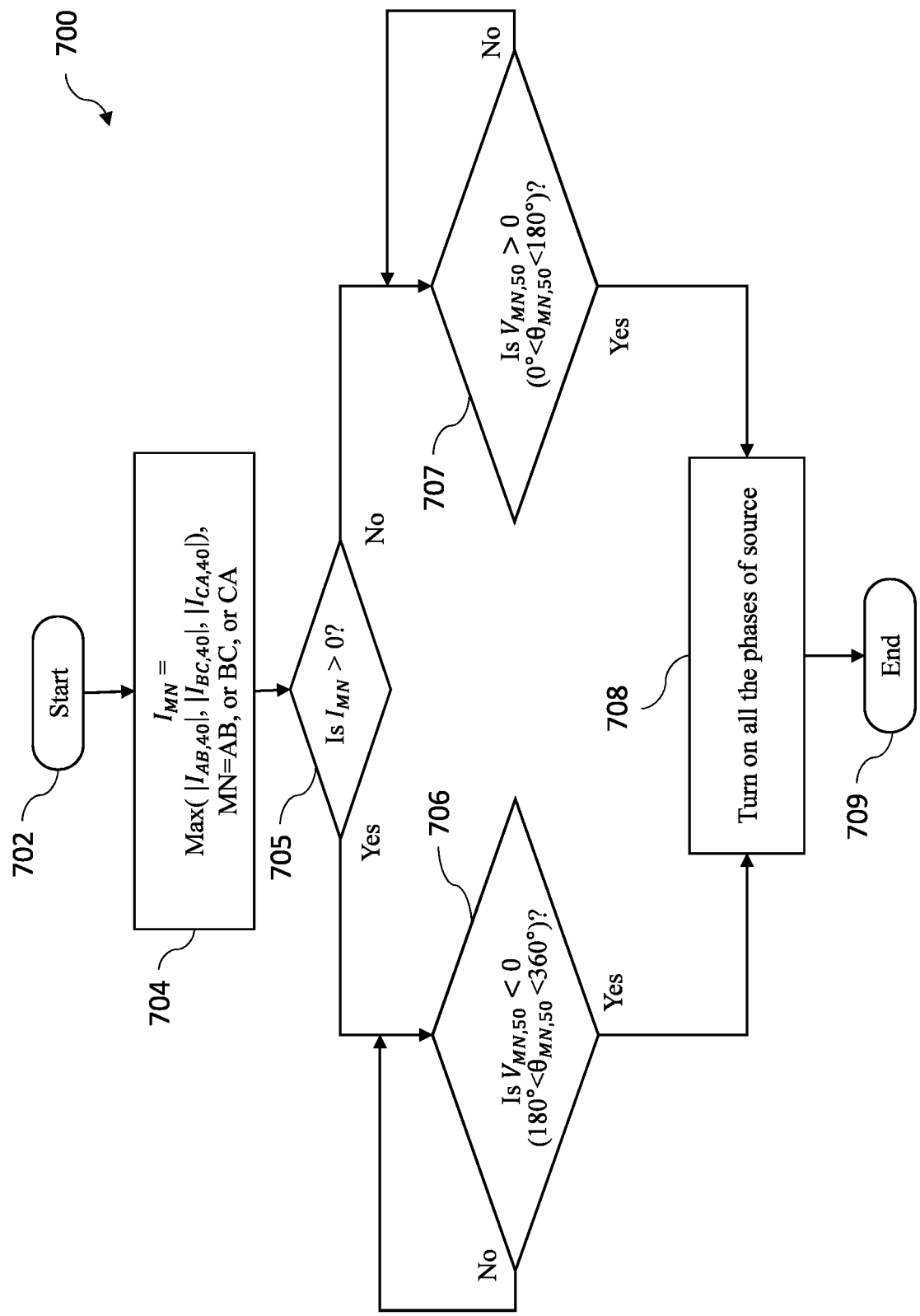
FIG. 7 is a flow diagram illustrating certain aspects of an example process of determining a voltage phase angle

With reference to FIG. 7, there is illustrated a flow diagram depicting certain aspects of an example process 700 of determining a source voltage phase angle (θ) effective to desaturate a saturated phase of the transformer 60 which has been powered by the source 40 and is transitioning the source 50. Process 700 begins at start operation 702 and proceeds to operation 704 which determines a phase current ($I_{MN}$) of the transformer 60 with the greatest magnitude in accordance with equation (7):

(7) $I_{MN} = \text{Max}(|I_{AB,40}|, |I_{BC,40}|, |I_{CA,40}|)$ for MN=AB, or BC, or CA, where $|I_{AB,40}|$ is the absolute value of the difference between the current of phase A and the current of phase B of transformer 60 and source 40, $|I_{BC,40}|$ is the absolute value of the difference between the current of phase B and the current of phase C of transformer 60 and source 40, $|I_{BCA,40}|$ is the absolute value of the difference between the current of phase B and the current of phase C of transformer 60 and source 40, and MN is one of phases AB, BC, and CA.

From operation 704, process 700 proceeds to conditional 705 which evaluates whether the phase current ($I_{MN}$) is greater than zero. If the evaluation by conditional 705 is affirmative, process 700 proceeds to conditional 706 which evaluates at least one of (a) whether a voltage of a corresponding phase MN of source 50 ($V_{MN,50}$) is less than zero ($V_{MN,50} < 0$), and (b) a phase angle of the corresponding phase MN of source 50 is greater than 180 degrees and less than 360 degrees ($180° < \theta_{MN,50} < 360°$). If the evaluation by conditional 706 is negative, process 700 repeats the evaluation of conditional 706. If the evaluation by conditional 706 is affirmative, process 700 proceeds to operation 708 which turns on phases A, B, and C of source 50. It shall be appreciated that the evaluation(s) performed by operation 706 comprise examples of determining a recoupling timing which is configured or effective to desaturate a saturated transformer phase and mitigate a related inrush current. Process 700 then proceeds to end operation 709 and may be subsequently repeated in connection with another source transition.

If the evaluation by conditional 705 is negative, process 700 proceeds to conditional 707 which evaluates whether at least one of (a) a voltage of a corresponding phase MN of source 50 ($V_{MN,50}$) is greater than zero ($V_{MN,50} > 0$), and (b)

a phase angle of the corresponding phase MN of source 50 is greater than 0 degrees and less than 360 degrees ($180°<\theta_{MN,50}<360°$). If the evaluation by conditional 707 is negative, process 700 repeats the evaluation of conditional 707. If the evaluation by conditional 707 is affirmative, process 700 proceeds to operation 708 which turns on phases A, B, and C of source 50. It shall be appreciated that the evaluation(s) performed by operation 707 comprise examples of determining a recoupling timing which is configured or effective to desaturate a saturated transformer phase and mitigate a related inrush current. Process 700 then proceeds to end operation 709 and may be subsequently repeated in connection with another source transition.

Process 700 may be configured to optimize the selection of a desaturation phase angle or associated timing for turning on the phases of the power source to which it is transitioning. Ideally, the determined desaturation voltage phase angle is selected at zero degrees to maximize mitigation of negative saturation of a transformer phase, or at 180 degrees to maximize mitigation of positive saturation of a transformer phase. Optimization may also be achieved by allowing tolerance of margin after the ideal phase angles or corresponding timings, for example, selection up to a maximum percent delay after ideal (e.g., one percent, two percent, or three percent) or selection up to a maximum number of degrees after ideal (e.g., up to 3, 4, or 5 degrees to mitigate positive saturation, or up to 183, 184, or 185 degrees to address negative saturation) or a corresponding timing.

For multi-phase systems, process 700 may be configured to concurrently desaturate a positively saturated transformer phase and a negatively saturated transformer phase. A phase angle and associated timing for such concurrent saturation may be selected as the phase angle range where both a negative source voltage is present for the phase with positive saturation, and a positive source voltage is present for the phase with negative saturation. An example implementation of such a technique may be realized by performing operations according to conditionals 706 and 707 together (e.g., concurrently or in repeated succession) and initiating an operation according to operation 708 when both such conditionals evaluate affirmative.

Further description of several example embodiments shall now be disclosed. A first example embodiment is a method comprising: energizing a transformer from a deenergized state by performing the acts of: turning on a solid-state transfer switch to conductively couple a power source on a first side of the solid-state transfer switch and a transformer on a second side of the solid-state transfer switch; evaluating an inrush current to the transformer from the power source; in response to the inrush current meeting a first criterion, turning off the solid-state transfer switch to conductively decouple the power source and the transformer; determining a recoupling timing for the solid-state transfer switch; and turning on the solid-state transfer switch in response to the recoupling timing effective to complete energization of the transformer with the inrush current to the transformer being limited by the first criterion.

In some forms of the first example embodiment, the first criterion comprises a current threshold. In some such forms, the act of turning on the solid-state transfer switch in response to the recoupling timing is effective to complete energization of the transformer with the inrush current being limited by the current threshold.

In some forms of the first example embodiment, the first criterion indicates a phase of the transformer in saturation. In some such forms, the act of determining the recoupling timing comprises determining a voltage phase angle of the power source satisfying a second criterion. In some such forms, the second criterion comprises the voltage phase angle of the power source being effective to desaturate the phase of the transformer in saturation. In some such forms, the act of determining the recoupling timing comprises evaluating at least one of a phase voltage and a phase angle.

A second example embodiment is a system comprising: a power source conductively coupled with a first side of a solid-state transfer switch; a transformer operatively coupled with a second side of the solid-state transfer switch; and an electronic control system configured and operable to energize the transformer from a deenergized state by: turning on the solid-state transfer switch to conductively couple the power source and the transformer; evaluating an inrush current to the transformer from the power source; in response to the inrush current meeting a first criterion, turning off the solid-state transfer switch to conductively decouple the power source and the transformer; determining a recoupling timing for the solid-state transfer switch; and turning on the solid-state transfer switch in response to the recoupling timing effective to complete energization of the transformer with the inrush current being limited by the first criterion.

In some forms of the second example embodiment, the first criterion comprises a current threshold. In some such forms, the electronic control system is configured and operable to complete energization of the transformer with the inrush current being limited by the current threshold.

In some forms of the second example embodiment, the electronic control system is configured and operable to identify a phase of the transformer in saturation in response to the inrush current. In some such forms, the electronic control system is configured and operable to determine the recoupling timing by determining a voltage phase angle of the power source satisfying a second criterion. In some such forms, the second criterion comprises the voltage phase angle of the power source being effective to desaturate the phase of the transformer in saturation. In some such forms, the electronic control system is configured and operable to evaluate at least one of a phase voltage and a phase angle to determine the voltage phase angle of the power source satisfying a second criterion.

A third example embodiment is an apparatus comprising: an electronic control system comprising one or more non-transitory memory devices configured with instructions executable by the electronic control system to energize the transformer from a deenergized state by: turning on a solid-state transfer switch to conductively couple a power source and a transformer; evaluating an inrush current to the transformer from the power source; in response to the inrush current meeting a first criterion, turning off the solid-state transfer switch to conductively decouple the power source and the transformer; determining a recoupling timing for the solid-state transfer switch; and turning on the solid-state transfer switch in response to the recoupling timing effective to complete energization of the transformer with the inrush current being limited by the first criterion.

In some forms of the third example embodiment, the first criterion comprises a current threshold. In some such forms, said instructions are executable by the electronic control system to complete energization of the transformer with the inrush current being limited by the current threshold.

In some forms of the third example embodiment, wherein said instructions executable by the electronic control system to identify a phase of the transformer in saturation in response to the inrush current. In some such forms, said instructions executable by the electronic control system to determine the recoupling timing by determining a voltage phase angle of the power source satisfying a second criterion. In some such forms, the second criterion comprises the voltage phase angle of the power source being effective to desaturate the phase of the transformer in saturation.

While a number of example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
energizing a transformer from a deenergized state by performing the acts of:
turning on a solid-state transfer switch to conductively couple a power source on a first side of the solid-state transfer switch and a transformer on a second side of the solid-state transfer switch,
evaluating an inrush current to the transformer from the power source;
in response to the inrush current meeting a first criterion, turning off the solid-state transfer switch to conductively decouple the power source and the transformer;
determining a recoupling timing for the solid-state transfer switch; and
turning on the solid-state transfer switch in response to the recoupling timing effective to complete energization of the transformer with the inrush current to the transformer being limited by the first criterion;
wherein the transformer can be fully energized within one source voltage cycle with limited inrush current.

2. The method of claim 1, wherein the first criterion comprises a current threshold.

3. The method of claim 2 wherein the act of turning on the solid-state transfer switch in response to the recoupling timing is effective to complete energization of the transformer with the inrush current being limited by the current threshold.

4. The method of claim 1, wherein the first criterion indicates a phase of the transformer in saturation.

5. The method of claim 4, wherein the act of determining the recoupling timing comprises determining a voltage phase angle of the power source satisfying a second criterion.

6. The method of claim 5, wherein the second criterion comprises the voltage phase angle of the power source being effective to desaturate the phase of the transformer in saturation.

7. The method of claim 6, wherein the act of determining the recoupling timing comprises evaluating at least one of a phase voltage and a phase angle.

8. A system comprising:
a power source conductively coupled with a first side of a solid-state transfer switch;
a transformer operatively coupled with a second side of the solid-state transfer switch; and
an electronic control system configured and operable to energize the transformer from a deenergized state by:
turning on the solid-state transfer switch to conductively couple the power source and the transformer;
evaluating an inrush current to the transformer from the power source;
in response to the inrush current meeting a first criterion, turning off the solid-state transfer switch to conductively decouple the power source and the transformer;
determining a recoupling timing for the solid-state transfer switch; and
turning on the solid-state transfer switch in response to the recoupling timing effective to complete energization of the transformer with the inrush current being limited by the first criterion;
wherein the transformer can be fully energized within one source voltage cycle with limited inrush current.

9. The system of claim 8, wherein the first criterion comprises a current threshold.

10. The system of claim 9, wherein the electronic control system is configured and operable to complete energization of the transformer with the inrush current being limited by the current threshold.

11. The system of claim 8, wherein the electronic control system is configured and operable to identify a phase of the transformer in saturation in response to the inrush current.

12. The system of claim 11, wherein the electronic control system is configured and operable to determine the recoupling timing by determining a voltage phase angle of the power source satisfying a second criterion.

13. The system of claim 12, wherein the second criterion comprises the voltage phase angle of the power source being effective to desaturate the phase of the transformer in saturation.

14. The system of claim 13, wherein the electronic control system is configured and operable to evaluate at least one of a phase voltage and a phase angle to determine the voltage phase angle of the power source satisfying a second criterion.

15. An apparatus comprising:
an electronic control system comprising one or more non-transitory memory devices configured with instructions executable by the electronic control system to energize a transformer from a deenergized state by:
turning on a solid-state transfer switch to conductively couple a power source and a transformer;
evaluating an inrush current to the transformer from the power source;
in response to the inrush current meeting a first criterion, turning off the solid-state transfer switch to conductively decouple the power source and the transformer;
determining a recoupling timing for the solid-state transfer switch; and
turning on the solid-state transfer switch in response to the recoupling timing effective to complete energization of the transformer with the inrush current being limited by the first criterion;
wherein the transformer can be fully energized within one source voltage cycle with limited inrush current.

16. The apparatus of claim 15, wherein the first criterion comprises a current threshold.

17. The apparatus of claim 16, wherein said instructions are executable by the electronic control system to complete energization of the transformer with the inrush current being limited by the current threshold.

18. The apparatus of claim 15, wherein said instructions executable by the electronic control system to identify a phase of the transformer in saturation in response to the inrush current.

19. The apparatus of claim 18, wherein said instructions executable by the electronic control system to determine the recoupling timing by determining a voltage phase angle of the power source satisfying a second criterion.

20. The apparatus of claim 19, wherein the second criterion comprises the voltage phase angle of the power source being effective to desaturate the phase of the transformer in saturation.

* * * * *